(No Model.)

A. C. MITCHELL.
MAKING METAL SCREWS.

No. 251,620. Patented Dec. 27, 1881.

WITNESSES

Adolph C. Mitchell INVENTOR

By Liggett & Liggett

ATTORNEYS

UNITED STATES PATENT OFFICE.

ADOLPH C. MITCHELL, OF CLEVELAND, OHIO, ASSIGNOR TO THE WHITE SEWING MACHINE COMPANY, OF SAME PLACE.

MAKING METAL SCREWS.

SPECIFICATION forming part of Letters Patent No. 251,620, dated December 27, 1881.

Application filed July 26, 1881. (No model.)

*To all whom it may concern:*

Be it known that I, ADOLPH C. MITCHELL, of Cleveland, in the county of Cuyahoga and State of Ohio, have invented certain new and useful Improvements in Milling-Tools; and I do hereby declare the following to be a full, clear, and exact description of the invention, such as will enable others skilled in the art to which it pertains to make and use it, reference being had to the accompanying drawings, which form part of this specification.

My invention relates to milling devices, and more particularly to such as are used in the manufacture of set-screws; and it consists in the peculiar construction of the same, as will be hereinafter fully set forth and claimed.

Figure 1:
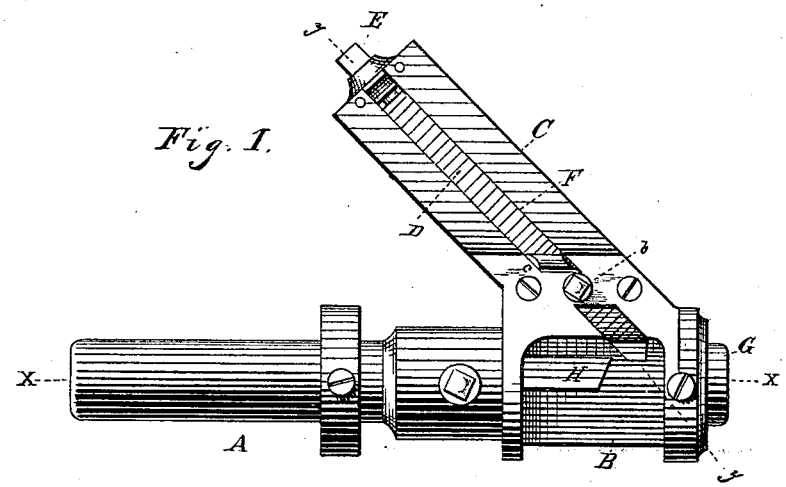
Figure 2:
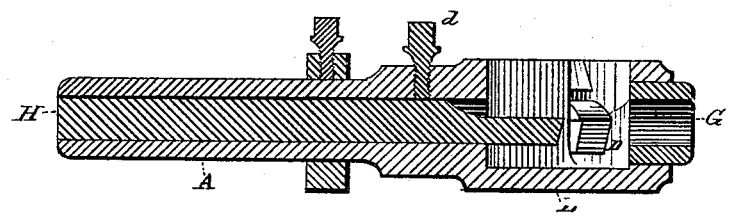
Figure 3:
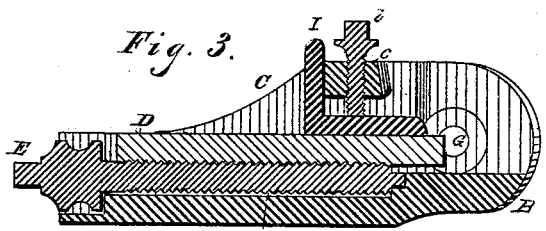
Figure 4:
Figure 5:

In the drawings, Figure 1 is a view of my device complete, showing the manner of constructing the same. Fig. 2 is a longitudinal section taken through the line $x$ $x$, Fig. 1. Fig. 3 is a section taken through the line $y$ $y$, Fig. 1. Fig. 4 is a view of the sizing-tool as used in tools of other construction, showing the manner of grinding or sharpening the same. Fig. 5 is a view of the under side of the sizing-tool used in my milling device, showing the manner of sharpening it, and also the thread-segment on its under side, the use of which will be hereinafter explained.

A is the shank of my milling device, which is made hollow and adapted to fit into a chuck and be revolved. At the forward end of this shank A is a head, B.

C is an arm, which extends from the head B at an acute angle to the shank A, preferably at an angle of about forty-five degrees. This arm C is provided with a slot, F, in which rests a sizing-tool, D. This sizing-tool D is constructed as shown in Fig. 5, and provided with a segment of a screw-thread, $a$, almost its whole length and on its under side, which engages with the set-screw E; and by turning said set-screw E to the right or left the tool D is adjusted nearer to or farther from the center of the head B. This tool D is held in place in the slot F, and also against the set-screw E, which is set in the lower part of the slot F by means of a plate, I, against which bears a set-screw, $b$, which passes through a bar, $c$, extending across the said slot F, near the head B.

G is a guide-bushing set in the forward end of the head B, through which the rod of iron or steel passes, to be turned or cut down to the desired size.

H is a pointing-tool, which passes through the hollow shank A of the milling device, and is held in the desired position by means of a set-screw, $d$, which passes through the said shank A. This pointing-tool H serves to point or smooth the ends of the set-screws after they have been sized by the tool D, and may be adjusted either backward or forward by loosening the screw $d$ and then moving it to the desired position, and then again tightening said set-screw.

The device being secured in a chuck of a lathe by means of the shank A, the screw-blanks are fed through the bushing G and are sized by contact with the tool D. The pointing-tool H operates to point the screws.

My reason for setting the arm C at an angle less than ninety degrees is that I get a better cutting-edge on my sizing-tool D, as shown in Figs. 1 and 5, the cutting-edge running diagonal to the grain of the steel. My sizing-tool D is also much more easily ground or sharpened than those now in use, (see Fig. 4,) where the arm is at a right angle to the shank.

What I claim is—

1. In a milling device, the arm for holding the sizing-tool, said arm being at an angle less than ninety degrees to the shank of said milling device, substantially as and for the purpose shown and described.

2. In a milling device, the combination, with the shank and arm, of the tool D, provided with a screw-thread segment, a set-screw engaging therewith, and a device substantially as described for holding said tool and its screw in contact, as set forth.

In testimony whereof I have signed my name to this specification in the presence of two subscribing witnesses.

ADOLPH C. MITCHELL.

Witnesses:
 JNO. CROWELL, Jr.,
 HENRY ABELS.